(12) United States Patent
Reese et al.

(10) Patent No.: US 11,954,317 B2
(45) Date of Patent: *Apr. 9, 2024

(54) SYSTEMS AND METHOD FOR A CUSTOMIZABLE LAYERED MAP FOR VISUALIZING AND ANALYZING GEOSPATIAL DATA

(71) Applicant: Elasticsearch B.V., Mountain View, CA (US)

(72) Inventors: Nathaniel Thomas Reese, Centennial, CO (US); Nicholas W. Knize, Lucas, TX (US); Thomas Raphaël Gentiel Neirynck, Louisville, KY (US)

(73) Assignee: Elasticsearch B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,722

(22) Filed: Jul. 22, 2022

(65) Prior Publication Data

US 2023/0048298 A1 Feb. 16, 2023

Related U.S. Application Data

(63) Continuation of application No. 16/662,509, filed on Oct. 24, 2019, now Pat. No. 11,397,516.

(51) Int. Cl.
| | |
|---|---|
| *G06F 3/048* | (2013.01) |
| *G06F 3/04817* | (2022.01) |
| *G06F 3/0482* | (2013.01) |
| *G06F 3/04845* | (2022.01) |
| *G06F 16/29* | (2019.01) |
| *H04L 67/01* | (2022.01) |

(52) U.S. Cl.
CPC ...... *G06F 3/04845* (2013.01); *G06F 3/04817* (2013.01); *G06F 3/0482* (2013.01); *G06F 16/29* (2019.01); *G06F 2203/04806* (2013.01); *H04L 67/01* (2022.05)

(58) Field of Classification Search
None
See application file for complete search history.

(56) References Cited

U.S. PATENT DOCUMENTS

| | | | |
|---|---|---|---|
| 2009/0027418 A1* | 1/2009 | Maru | G06F 16/29 345/629 |
| 2011/0153186 A1* | 6/2011 | Jakobson | G01C 21/3682 715/702 |
| 2015/0009234 A1* | 1/2015 | Johnson | G01C 21/20 345/635 |
| 2015/0220594 A1* | 8/2015 | Leyba | G06F 16/284 707/706 |
| 2019/0138995 A1* | 5/2019 | Currin | G06Q 10/103 |

* cited by examiner

*Primary Examiner* — William C Trapanese
(74) *Attorney, Agent, or Firm* — Quinn IP Law

(57) ABSTRACT

Systems and methods for providing for visualization and analysis of geospatial data are described. An example method includes automatically generating a first map comprising a plurality of layers that each comprise part of the input data, providing a graphical user interface for receiving at least one selection from the user of one or more of the plurality of layers of the first map for display and an indication that the user has zoomed in on the first map to a first area featuring a symbol corresponding to an item of interest, and automatically generating, based on bounds of the dataset, a second map showing a second area of a bounding shape selected to fit the data related to the item of interest.

17 Claims, 14 Drawing Sheets

SYSTEMS AND METHOD FOR A CUSTOMIZABLE LAYERED MAP FOR VISUALIZING AND ANALYZING GEOSPATIAL DATA

CROSS REFERENCE TO RELATED APPLICATIONS

This application is a continuation of and claims the benefit and priority of U.S. application Ser. No. 16/662,509, filed on Oct. 24, 2019, which is hereby incorporated by reference herein in its entirety, including all references and appendices cited therein, for all purposes.

FIELD

The present technology pertains in general to data visualization, and more specifically, to providing multi-layer mapping of geospatial and other data to facilitate data visualization and analysis.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for visualization and analysis of geospatial data. In various embodiments, a user interface is provided for a visualization platform for providing pre-configured vector layer and based layer maps to enable customization of the maps for a myriad of use cases. Data from different sources may be layered in a single map.

Various embodiments provide for various properties of the data features on a map to be styled individually. Visual properties such as line styles, colors and symbol sizes, to name a few, can also be configured based on values in the user data. The visibility of individual layers of the map can be fully controlled by a user using scale regions to reduce visual clutter, in some embodiments.

An exemplary computer-implemented method includes receiving input data comprising at least geospatial data; automatically generating a first map comprising a plurality of layers that each comprise part of the input data; providing a graphical user interface for receiving at least one selection from a user of one or more of the plurality of layers of the first map for display; automatically generating a second map based on the user selection; and automatically causing display of the second map on a computer device of the user.

In various embodiments, a system is provided including a processor and a memory communicatively coupled to the processor, the memory storing instructions executable by the processor to: receive input data comprising at least geospatial data; automatically generate a first map comprising a plurality of layers that each comprise part of the input data; provide a graphical user interface for receiving at least one selection from a user of one or more of the plurality of layers of the first map for display; automatically generate a second map based on the user selection; and automatically cause display of the second map on a computer device of the user.

In some embodiments, instead of relying on manual input from a GUI, the map can be built based on a configuration received from the user.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
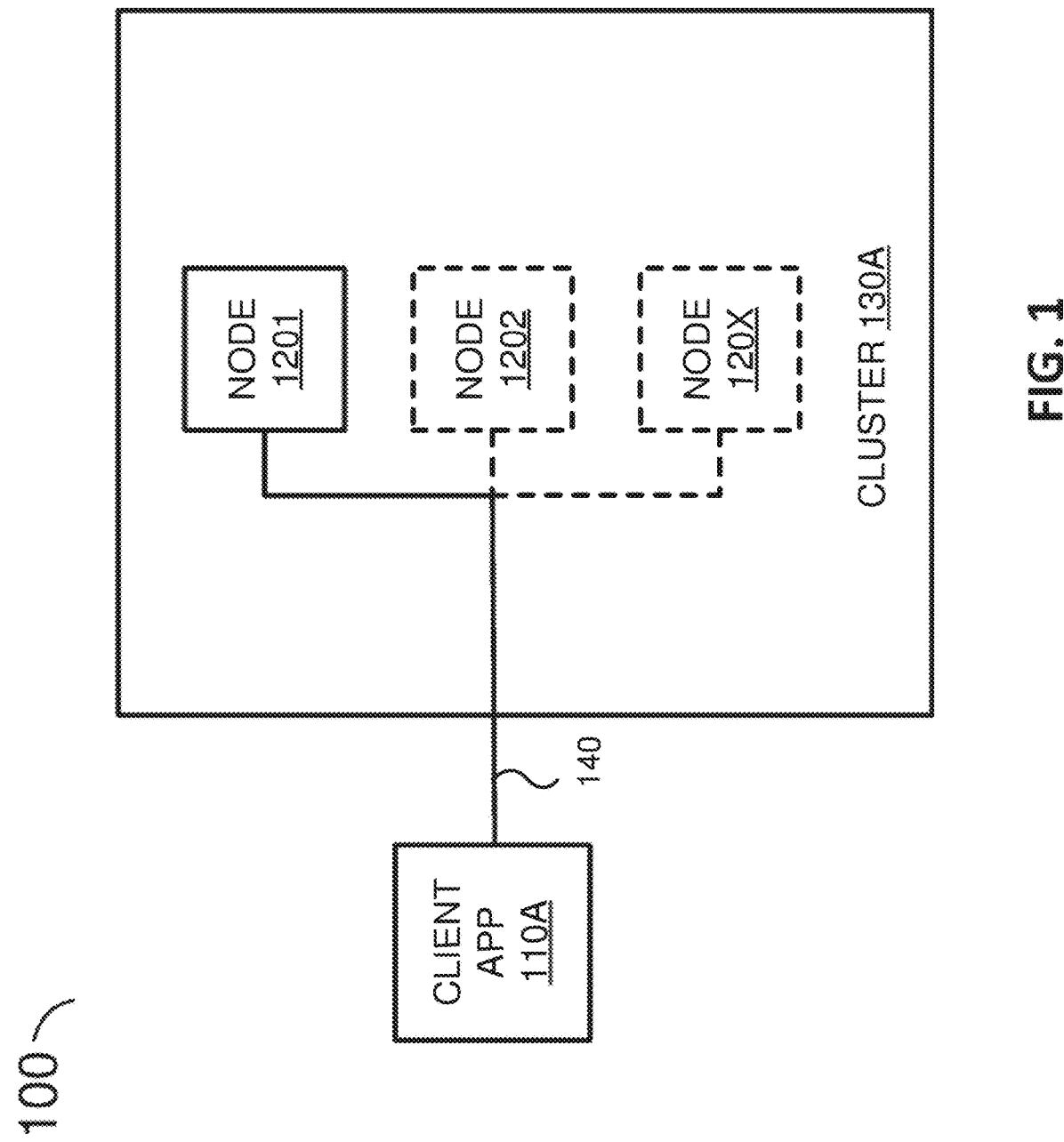
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for providing for visualization and analysis of geospatial data.

Figure 2:
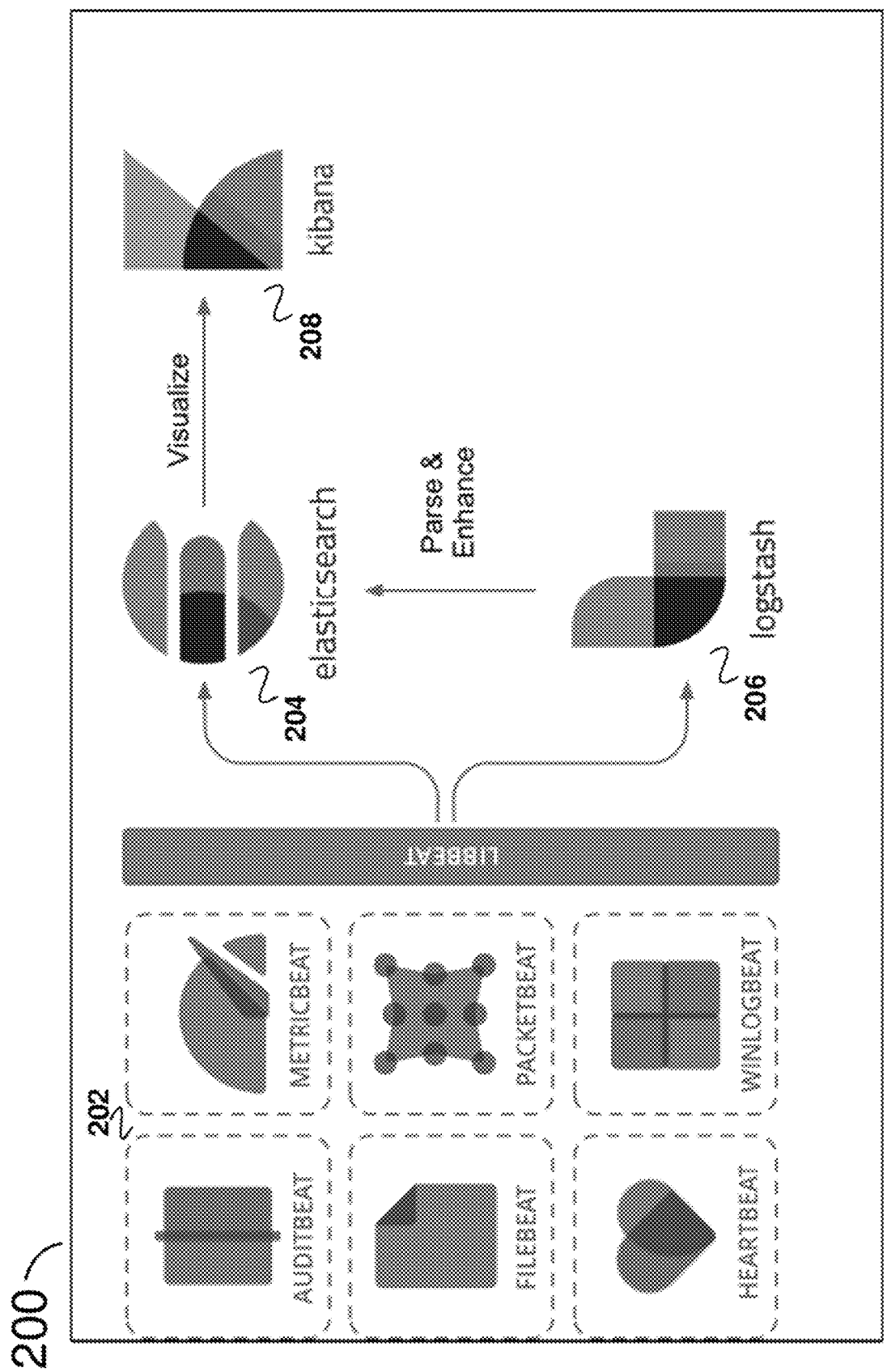
FIG. 2 is an example overall diagram illustrating various aspects and process flow, according to example embodiments.
Figure 3:
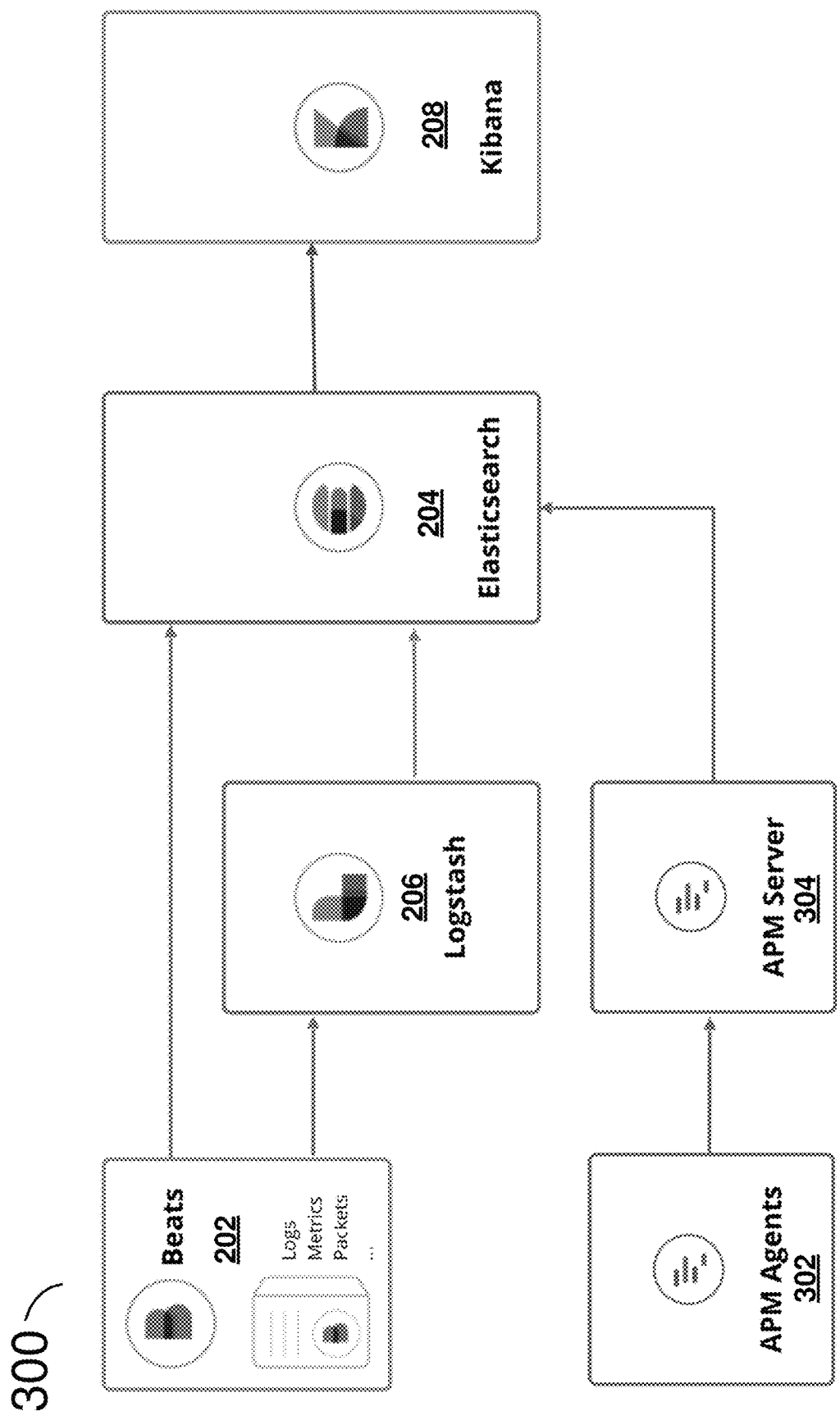
FIG. 3 is an example overall diagram showing various aspects within the environment in the example in FIG. 2, according to some embodiments.

FIGS. 1-3 provide an overview of an example overall system and some aspects and components that may be used for some embodiments.

FIG. 1 is a simplified diagram illustrating a system 100 to illustrate certain concepts of the distributed nature and distributed application structure, according to some embodiments. System 100 includes client application 110A, one or more nodes 1201-120X, and connections 140. Collectively, one or more nodes 1201-120X form cluster 130A. When only one node (e.g., node 1201) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 110A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 1500 of FIG. 15. Virtual machines may provide a substitute for a physical computing system and the functionality needed to execute entire operating systems.

When client application 110A runs on a different physical server from a node (e.g., of one or more nodes 1201-120X), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes 1201-120X) runs on a different physical computing system from another node (of one or more nodes 1201-120X), connections 140 can be a data communications network. Further details regarding the distributed application structure can be found in commonly assigned U.S. patent application Ser. No. 16/047,959, filed Jul. 27, 2018 and incorporated by reference herein.

Having provided the above details of certain concepts of the distributed application structure described above, the description now turns to further aspects of various components on an example platform that could be used for practicing the present technology, according to various embodiments.

Although various example embodiments are described herein with respect to KIBANA and other elements of an integration solution called ELASTIC STACK, the present technology is not so limited.

KIBANA provides for data visualization and exploration, for example, for log and time-series data analytics, application monitoring, and other use cases regarding a user's data on its servers, cloud-based services used, etc.

FIG. 2 is an example diagram of a system 200 illustrating KIBANA connections and flow with respect to other aspects of an integrated solution referred to as ELASTIC STACK. BEATS 202 can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). Although each of those is shown in FIG. 2, BEATS need not include all of those elements in this example. BEATS can send data directly into ELASTICSEARCH 204 or via LOGSTASH 206 (a data-collection and log-parsing engine) where it can be further processed and enhanced before visualizing, analyzing and exploring it using KIBANA 208). Although FIG. 2 includes KIBANA 208 and other particular aspects and components, the present technology is not limited to utilizing some or all of the components and aspects.

KIBANA 208 can provide a powerful and easy-to-use visual interface with features such as histograms, line graphs, pie charts, sunbursts and the can enable a user to design their own visualization, e.g., leveraging the full aggregation capabilities of the ELASTICSEARCH 204 (a distributed, multitenant-capable full-text analytics and search engine). In that regard, KIBANA 208 can provide tight integration with ELASTICSEARCH 204 for visualizing data stored in ELASTICSEARCH 204. KIBANA 208 may also leverage the Elastic Maps Service to visualize geospatial data, or get creative and visualize custom location data on a schematic of the user's choosing. Regarding time series data, KIBANA 208 can also perform advanced time series analysis on a company or other user's ELASTICSEARCH 204 data with provide curated time series user interfaces (UI)s. Queries, transformations, and visualizations can be described with powerful, easy-to-learn expressions. Relationships can be analyzed with graph exploration.

With KIBANA 208, a user may take the relevance capabilities of a search engine, combine them with graph exploration, and uncover the uncommonly common relationships in the user's ELASTICSEARCH 204 data. In addition, KIBANA 208 can enable a user to detect the anomalies hiding in a user's ELASTICSEARCH 204 data and explore the properties that significantly influence them with unsupervised machine learning features. A user could also, e.g., using CANVAS, infuse their style and creativity into presenting the story of their data, including live data, with the logos, colors, and design elements that make their brand unique. This covers just an exemplary subset of the capabilities of KIBANA 208.

It can be provided for the user to share visualizations and dashboards (e.g., KIBANA 208 or other visualizations and dashboards) within a space or spaces (e.g., using KIBANA SPACES), with others, e.g., a user's team members, the user's boss, their boss, a user's customers, compliance managers, contractors, while having access controlled.

FIG. 3 is an example overall diagram 300 showing various application performance monitoring (APM) aspects within the environment in the example in FIG. 2, according to some embodiments. In the example in FIG. 3, a plurality of APM agents 302 are included. In various embodiments, the APM agents are open source libraries written in the same language as a user's service. A user may install APM agents 302 into their service as the user would install any other library. The APM agents 302 can instrument a user's code and collect performance data and errors at runtime. In various embodiments, the collected performance data and errors (also referred to collectively as collected data or just data) is buffered for a short period and sent on to APM Server 304 304. In some embodiments, the APM Server 304 is an open source application which typically runs on dedicated servers. The APM Server 304 may receive the collected data from the APM agents 302 through an application programming interface (API). In some embodiments, the APM Server 304 creates documents from the collected data from the APM agents 302 and store the documents in the full-text search and analytics engine, e.g., ELASTICSEARCH 204 in this example. ELASTICSEARCH 204 can allow the user to store, search, and analyze big volumes of data quickly and in near real time. The documents can include APM performance metrics. As further described herein, KIBANA 208 is an open source analytics and visualization platform designed to work with ELASTICSEARCH 204. KIBANA 208 may be used to search, view, and interact with data stored in ELASTICSEARCH 204. KIBANA 208 may also be used to visualize APM data by utilizing the APM UI.

In various embodiments, a user interface is provided for a visualization platform for providing pre-configured vector layer and based layer maps to enable customization of the maps for a myriad of use cases.

In various embodiments, location is often a critical part of search, for example, for investigating the source of attacks on a user's network, diagnosing slow application response times occurring in a specific region, or tracking a user's delivery vehicles in real time, to name just a few non-limiting examples. For example, a delivery service might use the underlying system (such as Elasticsearch) for their shipment and vehicle data, and be provided mapping for visually monitoring all of their shipments worldwide. The delivery service may have many trucks and airplanes in their delivery fleet with GPS location data being pinged every second (and being provided to Elasticsearch for instance). The delivery service may wish to visualize where all of their shipments, but then zoom to a level to ascertain for instance how are shipments on route 110 in Denver doing, are they on track, or are they behind? If it's a holiday seasons, the delivery service may need to know if additional vehicles are needed so deliveries can be routed faster.

In various embodiments, data that is available (e.g., in Elasticsearch) can be used to build the custom layers for the map (on top of the base layer having road and other contextual information) for this particular use. The map can then provide answers to the user for various types of questions they may have about their data set.

Figure 4:
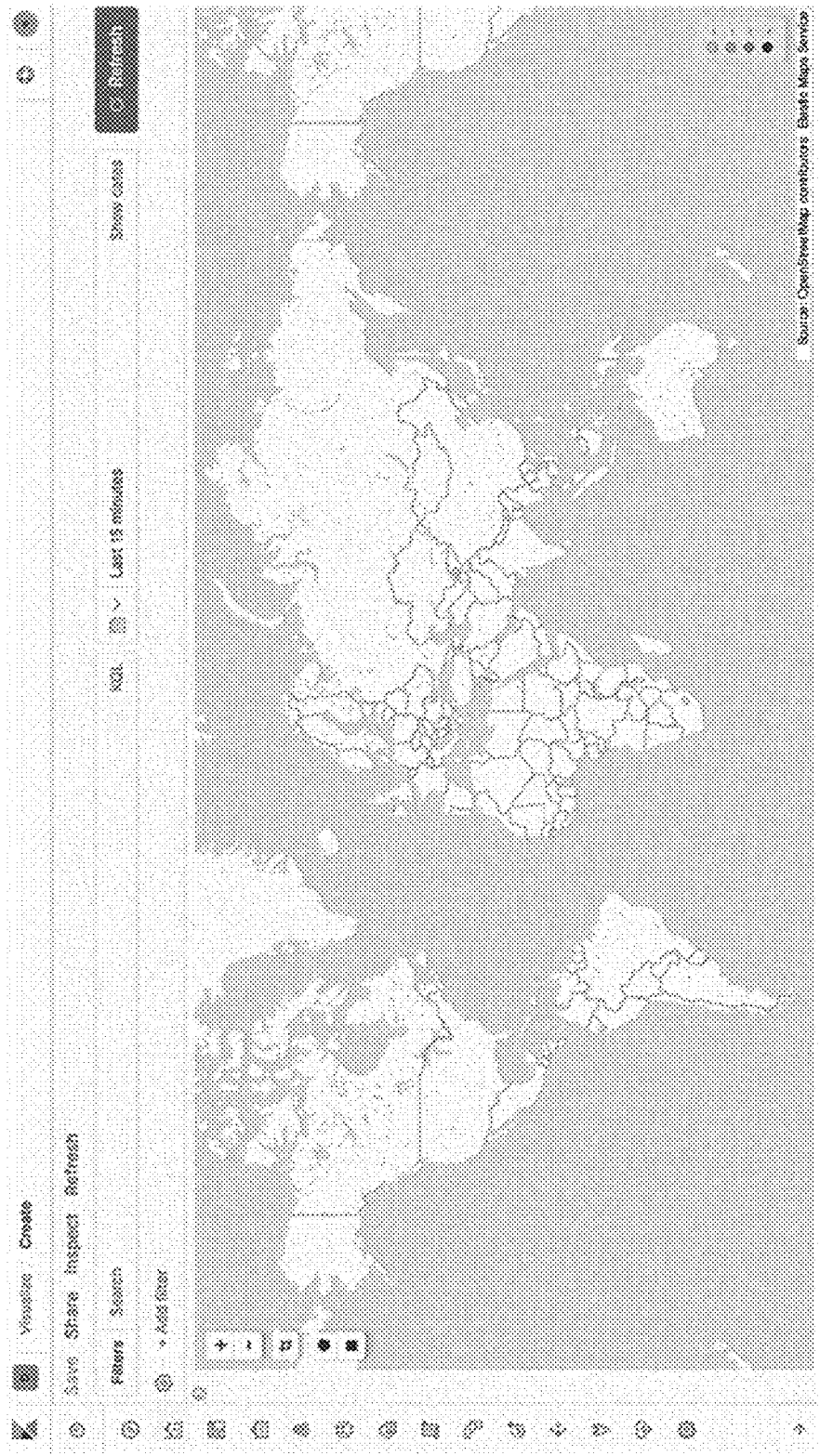
FIG. 4 shows an example world map onto which various filters and/or layers can be configured for customization, according to various embodiments.

FIG. 4 shows an example world map 400 onto which various filters and/or layers can be configured for customization. This may be a base layer in a map visualization including underlying map data that is not specific to any user. In various embodiments, additional layers can be added for customization so that users can add their own data and be presented with a visualization of things that are of particular interest to them.

In the aforementioned delivery service example, various embodiments enable the user to add a layer to the map to show an aggregated view of their GPS tracks which can be from different sources (e.g., delivery trucks, airplanes, drones, and other vehicles) of data ingested into Elasticsearch. Once the layer(s) are added, the user can configure the map various ways to symbolize the data, configure color, points, icons and other symbols (e.g., configure an arrow whose direction is based on the orientation from the GPS tracks, to see which way the trucks are driving down the road, etc.). Color can also be configured to set color schemes for different routes or whatever made the most sense for the user's particular entity. Icons on the map can be sized such that for this example, the larger the size of the truck symbol to indicate it has more packages in it, that the truck is behind schedule, or anything that's in the data that can be used to symbolize the representations on the map.

Other data sources for the geospatial context may include data published in accordance with various tiling standards and protocols, e.g., Web Map Service (WMS) which is a standard protocol developed by the Open Geospatial Consortium in 1999 for serving georeferenced map images over the Internet; or Tile Map Service (TMS) which is a specification most widely supported by web mapping client and server, and is pretty widespread for enterprise mapping applications. One of the examples of data published according to these tiling standards is weather data, which in some embodiments can be overlaid on top of the map.

Often times, a user has very large quantities of geospatial data and visualizing that much geospatial data might not be feasible otherwise without use of the present technology in various embodiments since at some point, the map could otherwise just become a solid color of dots, because there's so much data. In various embodiments, the methods and systems include various aspects for conveying the geospatial locations and capturing their data in a way that is meaningful and not overwhelming for the user.

For example, some areas of the map may have a super high density of points and in some areas of the map that have a very low density of points. Various embodiments want to make sure to represent the data such that, for example, if there's an area that only has one or two points, it shows up as having data and then an area that has a really high density of data also shows us as having data, but that data is symbolized in such a way that a user can tell if an area has more data or less data, see e.g., FIG. 7 described further below.

Another problem with prior solutions is that as one changes the aspect of their map and are zooming into finer and finer areas at some point there is no longer the problem of too much data and it is desired to transition into viewing the actual data sets (e.g., for the more granular, finer area), instead of more of an aggregated data set. So if a user zooms in to get a finer grained view of an area, the zoom feature being fully adjustable by the user in various embodiments, the user can narrow in on certain data. Multiple selectable zoom levels may be provided, for example, 18-24 zoom levels in some embodiments, with more or less in other embodiments.

A common example is to show a heatmap with density plots when the user is zoomed out at small scales. As the user zooms in, the map can start showing clusters of documents. Then, as the user reaches a level where the clusters get smaller and smaller, the map can start showing the actual individual features. While the user is zooming, the user can use a tooltip functionality for example to read out either the aggregate metrics for a cluster, or, when zoomed in all the way, the field values of the individual documents that make up the cluster.

For example, when zoomed out there is much data which cannot practically be physically transmit from a user's cluster to a client computer because the user's data is potentially stored on thousands of computers, for example. So there's no way to squeeze all that data from potentially thousands of computers down the pipe and then put it onto one computer at the end of the line, but it is still desired to provide a visual representation of where all of that data is so that users know where to look for data, e.g., where there isn't data and where there is data. See the example flights use case in FIG. 7.

In various embodiments, a combination of server-side clustering and client-side symbolization is provided, e.g., to seamlessly create maps showing data of arbitrary size. Other attempted solutions generally only take one approach or the other. That is, other attempted solutions either they bring in all the data to the client and perform clustering client-side (does not work for enormous data sizes, but may have a nice visual effect), or they perform all clustering server-side without any of the client-side approaches to "smooth" out the coarser clustered view (may work for enormous data, but have a poor visual effect). Among the many advantages of various embodiments is that they can work with enormous data sizes while also providing very nice visual effects. Further details of some embodiments of this combination of server-side clustering and client-side symbolization are provided below.

In some embodiments, aggregations can bucket or otherwise group data on the server side so that all the data can be binned into grids. Metrics can be calculated for each of those gridded cells and then in some embodiments only the metrics for each grid is transmit. So it can be a very small amount of information being transmitted wirelessly or by wired means, to the actual client for visual representation. The grid aggregation metrics can be symbolized as point wherein a vector layer is created with a point for each gridded cell. The point location may be the weighted centroid of all geopoints in the gridded cell. There may be grid rectangles wherein a vector layer is created with a bounding box polygon for each gridded cell. The grid aggregation metrics can also be symbolized as a heat map wherein a heat map layer is created that clusters the weighted centroids for each gridded cell. There can be an automatic transition to show the raw underlying documents, e.g., if the user zooms in such that the document level is the proper visualization to show.

In various embodiments, the bucket sizes are never astronomical since there may be 10,000 of the buckets, or in some cases 10×100,000 buckets such that even if there are 100 metrics for each of the buckets, the amount of data is still manageable. Millions or billions of documents may be symbolized as a single symbol, for example.

A higher density of data may be symbolized with a different color. For example, a lighter color could symbolize low data density and a darker color could symbolize high density with a gradient scale.

Symbol size can also be used to visualize density. For example, a very small symbol could symbolize a small density and a very large symbol could symbolize a higher density.

Data from different sources may be layered in a single map. Drop layers from unique indices can be visualized in one view. In various embodiments, data source can include, but are not limited to, documents and grid aggregations (e.g., from Elasticsearch), files and tiles, self-hosted or 3rd party hosted vector layers and image services, including custom GeoJSON, tile services, or OGC Web Map Service, to name just a few non-limiting examples.

Multiple layer types are supported, each bringing its own set of functionality, for example, provide for using vector layers for vector data like GeoJSON, Elasticsearch documents, or grid aggregations. Features in these layers can be styled based on properties of the data and those features enriched with metrics derived from other data sources. Other example layers include heatmap layers which may be used to show densities of Elasticsearch data, for example, at different resolutions. Raster layers may be used for background layers or custom overlays, like weather maps or satellite imagery.

Visual properties such as line styles, colors and symbol sizes, to name a few, can also be configured by values in user data. The visibility of individual layers of the map can be fully controlled by a user using scale regions to reduce visual clutter, in some embodiments. For example, the maps can be configured to provide for individual documents to be shown, selectively or automatically, in response to a user being zoomed (e.g., using a slider or other control element) to a more granular zipcode level on the map, but only show aggregate counts when the map is zoomed out to the state or country level.

The individual documents can be configured to be features on a map. An example embodiment provides for additional contextual map data, such as boundary layers, to be visualized by indexing a user's features into Elasticsearch (a distributed, multitenant-capable full-text analytics and search engine) and bringing them into the maps application as a layer.

In some embodiments, an option is provided to enable a user to add their own custom vector shapes, tile map services, or web map services as layers in the map, enabling users to customize the map application/service for their particular needs.

In addition to providing the layers from a user's various indices on the same map, various methods provide for the user to search and filter across all of those indices in real time. For example, a user can monitor static server locations alongside dynamic attack locations in the same view; viewing them for instance in a user's cloud-based security operations center (SOC) platform. (The SOC can be a cloud-based platform that collects security event logs, correlates them against threat intelligence and provides actionable analytics via alarms, dashboards and reports. The SOC can combine event correlation and real-time alerting with long-term data retention in an easy-to-use web portal.) Various embodiments provide functionality for a user to, in response to spotting something of interest, zoom in and drill down on granular details like individual documents on the map.

Various ones of the above concepts are explained further by way of examples below.

Figure 5:
FIG. 5 illustrates an example map for security analytics use cases, according to some embodiments.

FIG. 5 illustrates an example map 500 for security analytics use cases. For this map 500, the method provides the capability for a user to monitor the security of their network of offices and other locations around the world. Several layers are shown in the example map 500.

Figure 6:
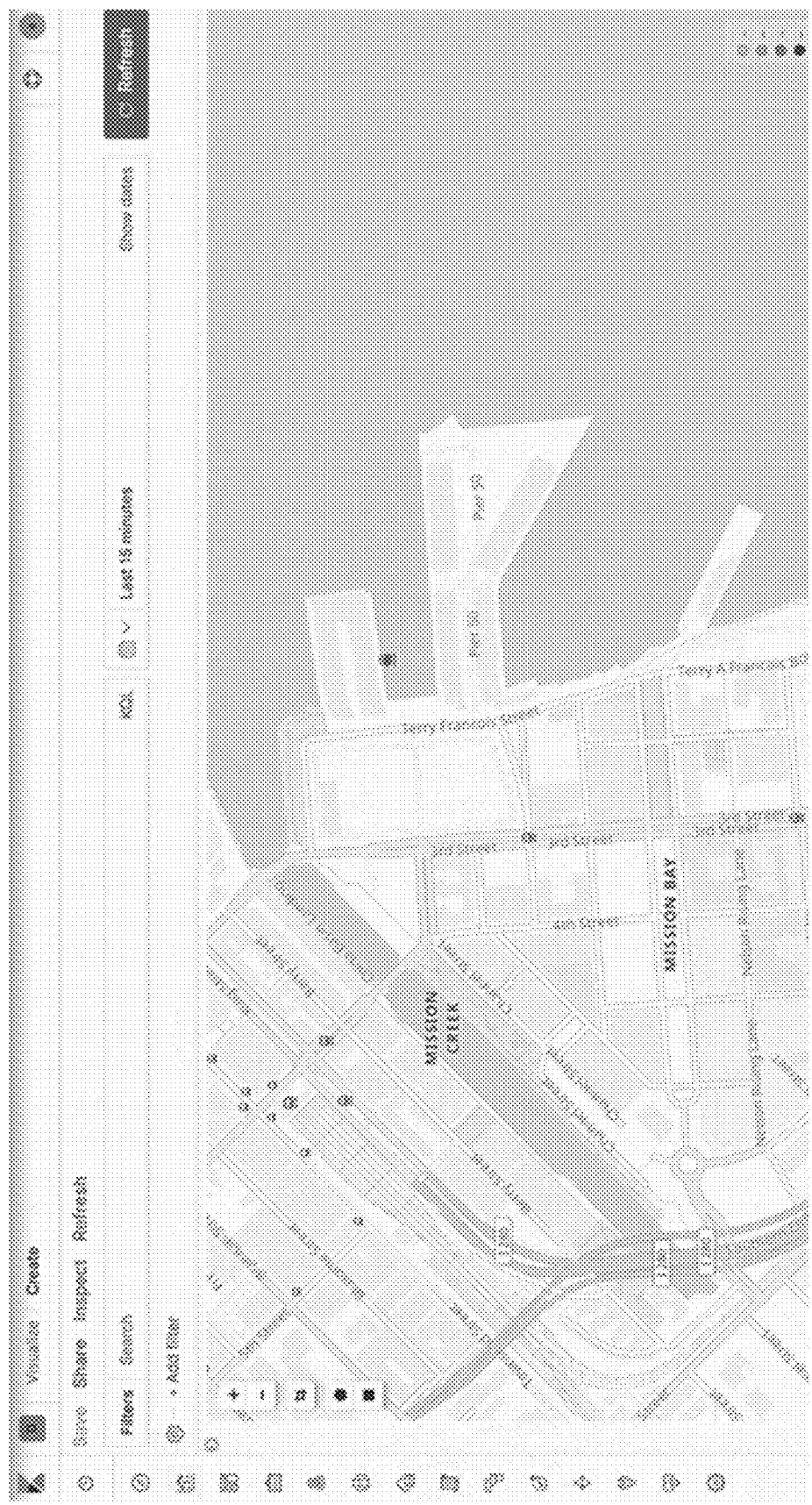
FIG. 6 illustrates an example map for visualizing a zoomed selection for drilling down into a more granular view.

FIG. 6 illustrates an example map 600 for visualizing a zoomed selection for drilling down into a more granular view. Slider(s) or other like user interface elements such as in the example in FIG. 6 may be provided to receive zoom selection for the drilling down. When zooming in, clustering from the server side can be blended with feature mapping from the client side.

Geographical data can be more than latitudes and longitudes. Each pin on the map may contain metrics, a timestamp, and additional metadata. All kinds of location data may be stored in a multi-tenant distributed search platform, such as, but not limited to, Elasticsearch, which data can be used, data from geopoints to geoshapes like polygons, circles, lines, multi-lines, and boxes, to text and various types of metrics and numeric data, which all can be utilized for the mapping.

Various embodiments provide for geo queries, like sorting by distance and filtering by bounding shapes, with other numerical and text queries to be used to analyze a user's data, e.g., in a single dashboard.

Other use cases include, but are not limited to, overlaying weather patterns and flight traffic in the same map view in order to visualize the impact of weather conditions on flights paths in real time; embedding promotions and sales data in the same map in order to analyze the impact of a portion across different locations of a retailer.

Figure 7:
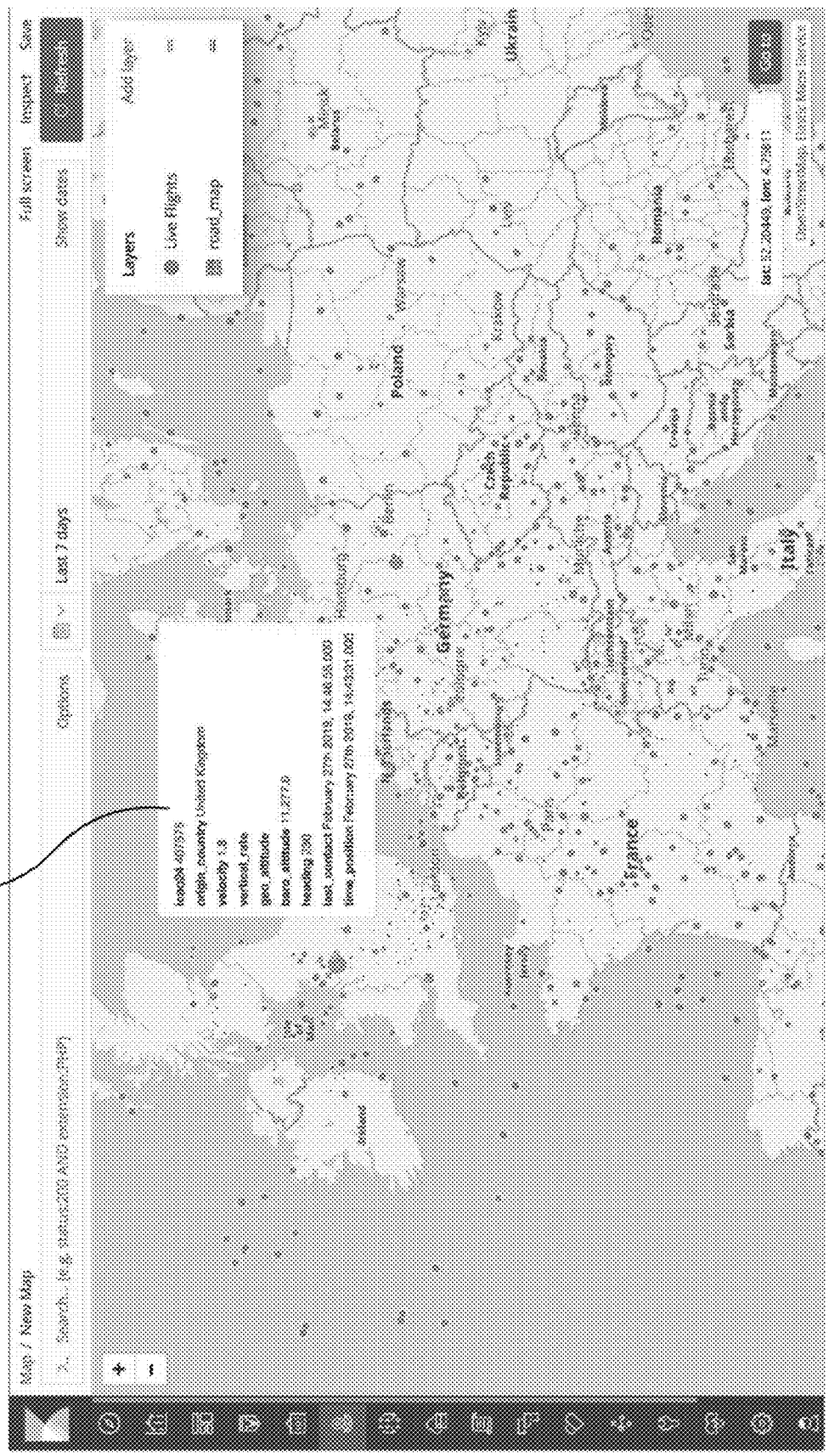
FIG. 7 illustrates an example map having a layer for live flights overlaid on a road map layer.

FIG. 7 illustrates an example map 700 having a layer for live flights overlaid on a road map layer. In response to selection of a particular live flight, data for the flight such as that shown in the example 702 can be displayed for the user to view for their analysis. In some embodiments, weather or other data can be in a layer that is overlaid onto the live flight data, e.g., to visualize that a weather front may adversely affect a particular flight.

In some embodiments, controls are provided for adjusting the ordering of layers or to completely hide a layer. For example, adding a layer for flight delays on top of the roadmap layer and live flight layer in the example in FIG. 7, and adding another layer to visualize weather and suppressing one or more layers when weather or flight delays are not relevant to the particular analysis being performed.

Figure 8:
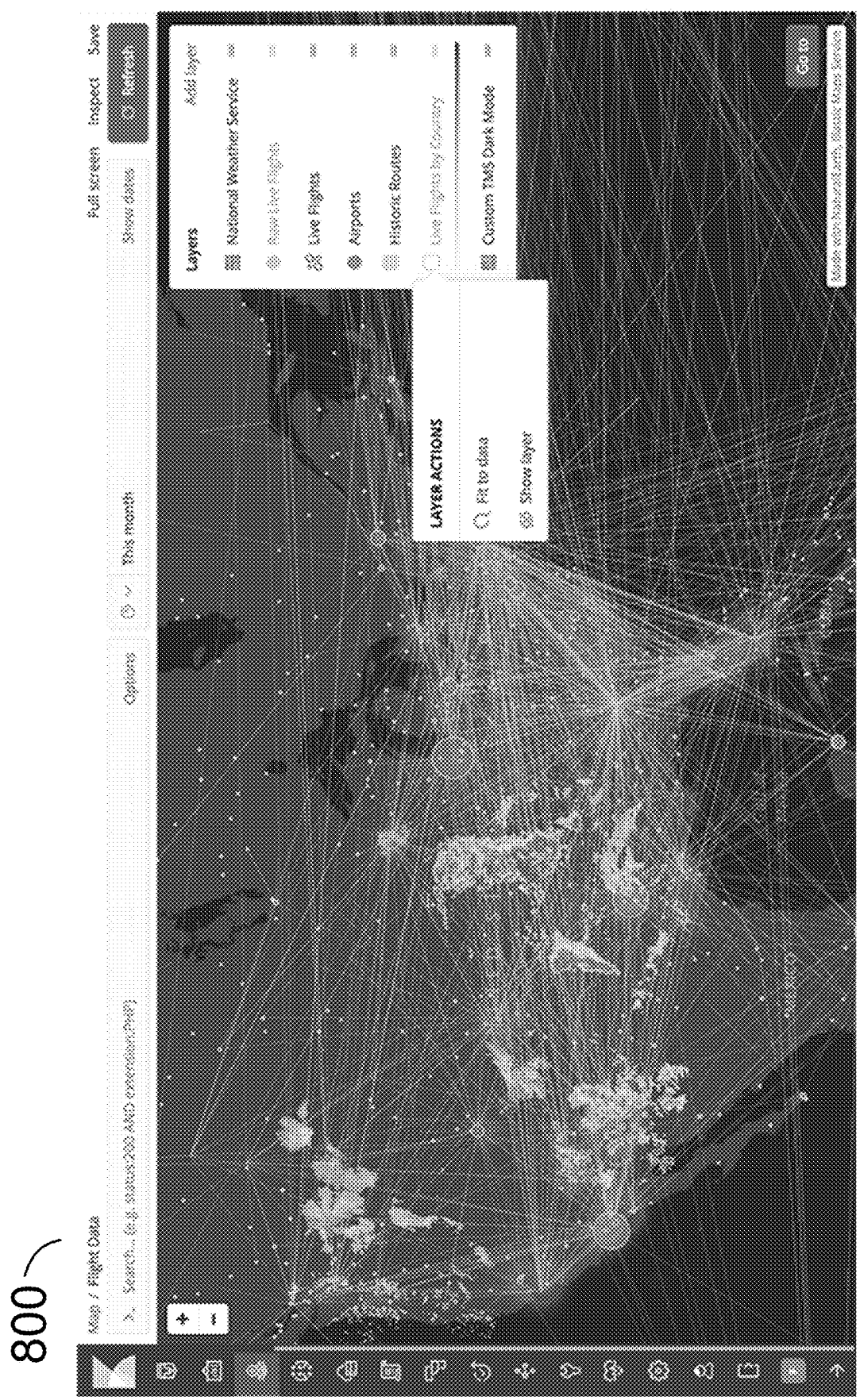
FIG. 8 illustrates an example map showing various layer concepts.

FIG. 8 illustrates an example of various ones of these layer concepts. A map 800 in this screenshot includes various example layers for weather, live flight data, airports, etc. Layer actions can also be provided. In the example in FIG. 8, layer actions are provided to fit to data or show layer, which illustrates the provided capability to hide a layer and to fit a layer to the data. Regarding the option to fit the data, a user may zoom in to focus on a particular small area on the map at which a symbol for a particular airplane is viewable, but may wish to see the entire map area of where data regarding that particular airplane is in their data set. By providing a selectable layer action to fit to data in this example, the example method and system can look in the server and provide the user with the bounds of their data set with respect to that particular airplane of interest. In this way, the map can properly zoom into an area that shows a user 100% of their data coverage for an item of interest. Calculations and other processing can occur on the server with the resultant bounding boxes being returned to the client device.

Figure 9:
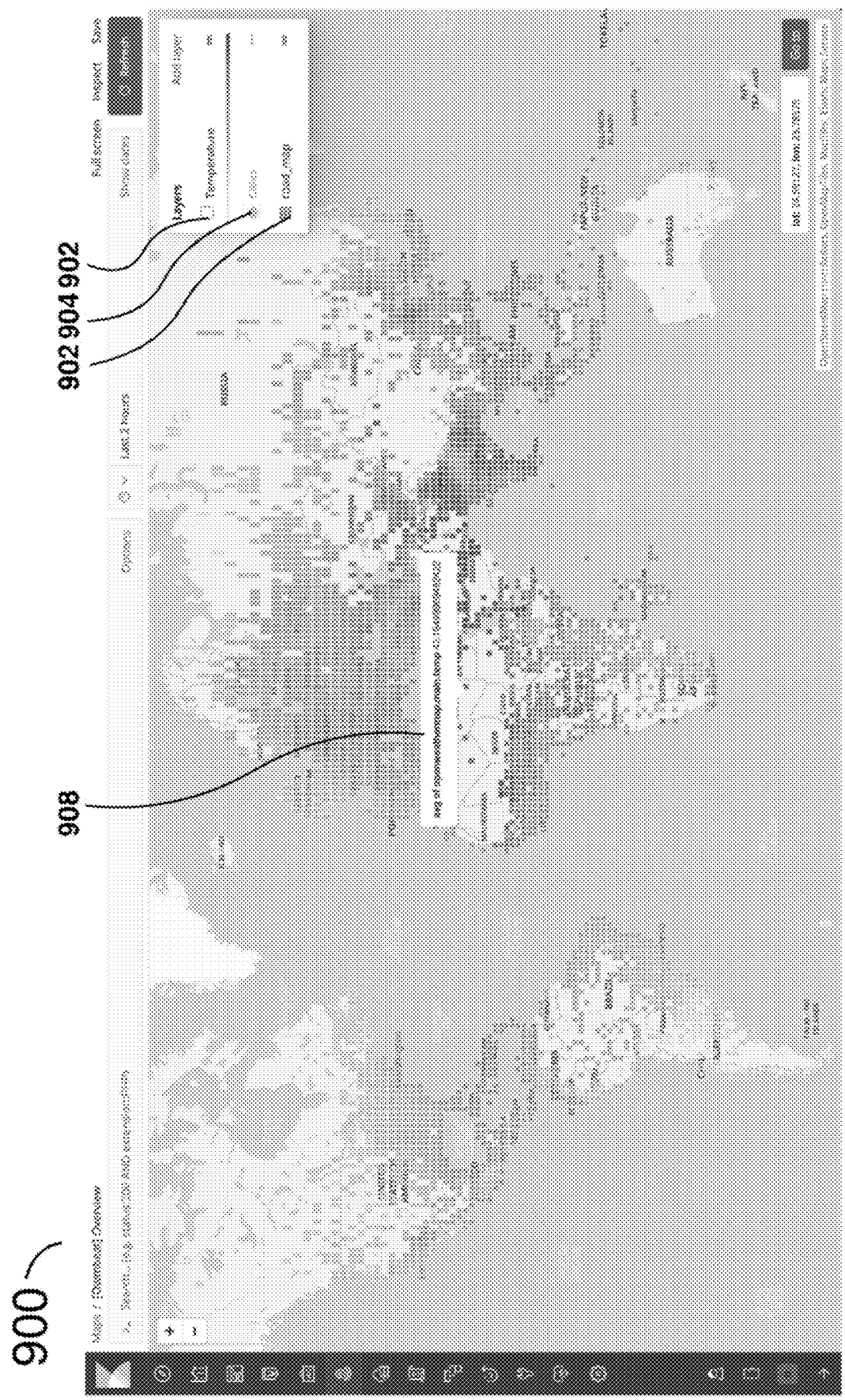
FIG. 9 illustrates an example map having a layer for temperature along with a road map layer and another layer (not selected in this example) for cities.

FIG. 9 illustrates an example map 900 having a layer 902 for temperature along with a road_map layer 902 and another layer 904 (hidden in this example) for cities. In response to selection of a particular portion of the map, average temperature data 908 can be extracted from a corresponding index and displayed on the map. As seen in this example various properties of the data features on a map can be styled individually and layers can be made hidden.

The multi-layered approached according to various embodiments enable a user to continually add information to their map that is relevant to their particular use case. In this way, a user can have everything viewable on a single pane to provide a cohesive picture, according to some embodiments.

Although the present technology is described herein with respect to certain examples, certain platforms, and certain services, the present technology is not so limited.

In various embodiments, the methods and systems are configured to handle myriad use cases, for any kind of data that can be ingested into the system and for which a map provides useful visualization. Additional examples follow.

Figure 10:
FIG. 10 illustrates an example multi-layered map for an e-commerce use case.

FIG. 10 illustrates an example multi-layered map 1000 for an e-commerce use case. In this example, e-commerce orders by country is a focus of the map which illustrates from which particular countries sales originate to provide an excellent visualization of the worldwide market for the particular product or service.

Figure 11:
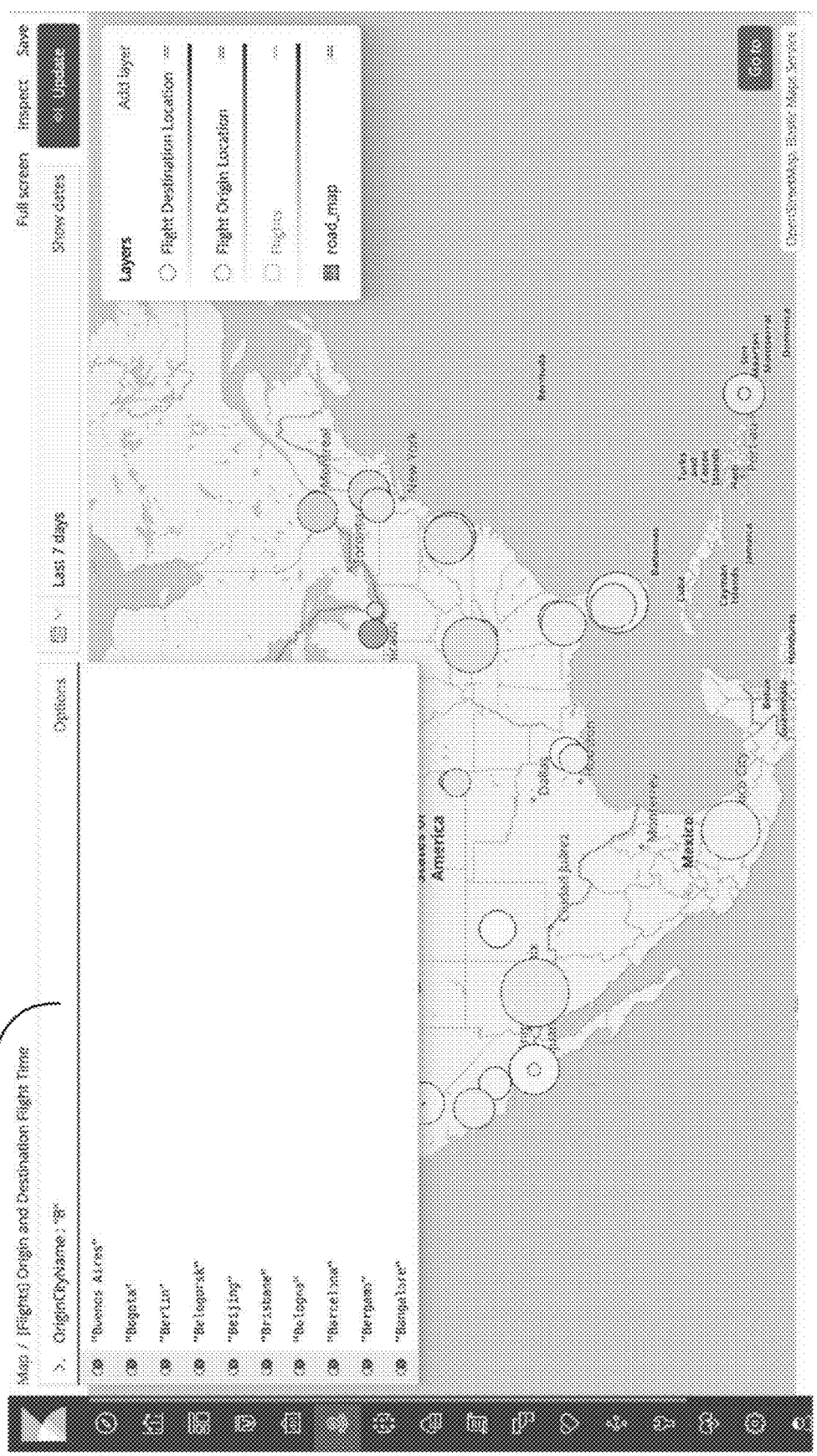
FIG. 11 illustrates another multi-layered map and querying therewithin from a search field, according to example embodiments.
Figure 12:
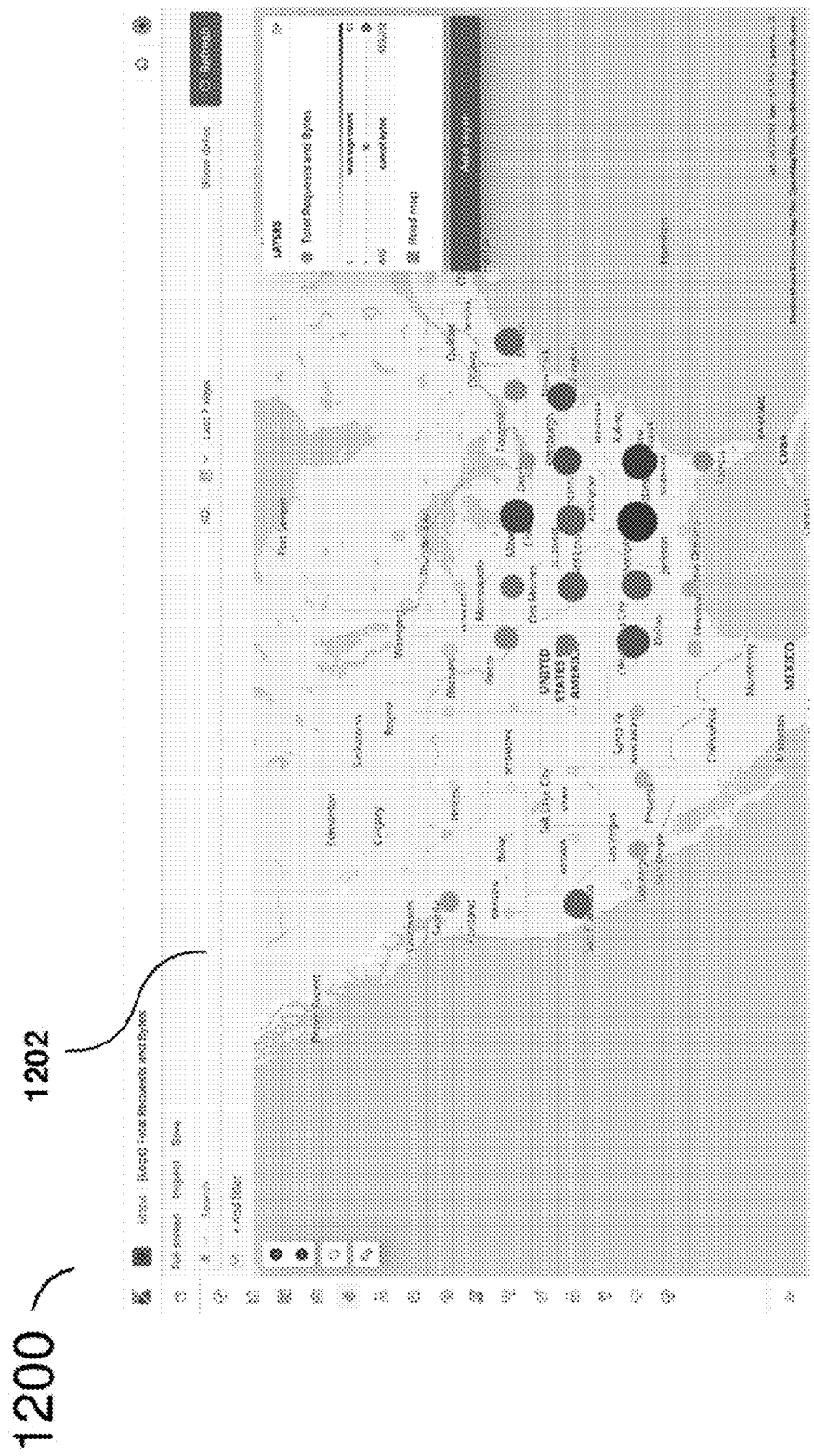
FIG. 12 illustrates an example map providing a search field for a real-time full-text search of the map, according to some embodiments.

FIG. 11 illustrates another multi-layered map 1100 and querying therewithin from a search field 1102. In this example, "OriginCityName" is queried where in response to receiving a letter "B", a dropdown list of selectable origin cities starting with that letter are shown to facilitate the searching. The use of dropdown list is just one example. In some embodiments, real-time full-text search capability on data of any size for the map is provided. FIG. 12 illustrates an example map 1200 having a search field for receiving user input for a full text search of the map, according to some embodiments. For example, in response to a user inputting "los angeles" a real-time search of the map would be conducted with results provided. In some embodiments, the search is not case sensitive. Various embodiments are configured to provide machine learning or other processing to provide the best match for the user input. Data of any size may be searched. The user input may be typed or otherwise input through various means.

In various embodiments, the methods and systems are configured to handle myriad use cases, for any kind of data that can be ingested into the system and for which a map can provide useful visualization. For example, one illuminating use case relates to fighting forest fires. The firefighting unit may for instance have six fixed wing aircraft flying over the fires capturing data using infrared (IR) sensors and/or other sensors to try to acquire heat signatures from which the actual path of the forest fire might be determined. All that sensor data can be ingested into the system and then a map service/application can provide for a user to visualize it. With the multi-layered approach, the firefighting command post can add and locate their various firefighting assets on the map, add on population centers to visualize which ones may be at risk, add hospitals to visualize with respect to the assets and fire path to determine routes for rescue vehicles and paramedics to take and which hospitals might be adversely impacted by the fire, to determine alternate facilities to use.

In some embodiments, maps are embedded in one or more dashboards and caused to behave like any other visualization on the dashboard. A user may desire to for example see a date histogram of time of their data distribution, or to see something that would be better visualized as a pie chart. So providing for embedding a map in a dashboard allows a user to view their geospatial dimensions along with all of their other data dimensions in visualizations that are better suited for displaying those dimensions. For example, a user can display a map along with a pie chart that shows some kind of breakout of their data along with a bar chart that shows another breakout of their data. Various embodiments enable the user to visualize the same data in various dimensions. The user can select the dimensions they desire to view in order to provide various insights for their particular use case. For instance, a pie chart could be used to show the classification of buildings in a town that were going to be impacted by a fire, for example, a slice of layer(s) of the map that could show just residential units, another slice that could show just commercial building, and yet another slice that could show healthcare facilities. So, for example, if it was needed to have police go door to door to send out notices to everyone in a residential area, they could just select the residential slice; which would filter across their map as well. The map would then show only residential areas in the path that were or could be impacted so police can go through every single one of those residential streets and alert people to evacuate.

In some embodiments, filters from the map can be sent to a global filter bar. Global filters and queries may be sent from other visualizations to apply to customize a user's map.

In another example use case, an election map could be created having polygons colored based on certain attributes such as red states and blue states based on the results of voting. In various embodiments, a polygon shape can be joined with data from a search query (e.g., an Elasticsearch or other search query). For example, all of the states of the United States could be served out. Each state could have a corresponding state code (e.g., California CA, Colorado CO, and Michigan Mi) and various embodiments provide for a user to tag their data set with those same state codes. So if the user conducted a poll, for instance, and for a poll taken of California residences, a CA tag could be given. If another resident was in Colorado, the CO tag would be given such that the data could be bucketed by the tags, so that the poll data was grouped by state and then metrics could be run. The resultant metric value, e.g., polls on how residences of different states feel about impeachment, could be joined with a corresponding polygon for the state, e.g., a California polygon. All data for the most populated state of California might encompass a very large index with millions of data points or billions of data points. In some embodiments, an average value could be determined and that value could be used to style the California polygon. The visualization would make it clear that it's an average (e.g., not shown as just a single dot on the map).

In some embodiments, a plat map of world countries could be shown and as the user zooms in, a plat map of the corresponding states in those countries could be visualized, as further zoomed in a plat map of the corresponding counties in those states could be visualized, and zooming even further the corresponding zip codes in those counties could be shown. In this way, a user can visualize finer and finer grains based on how buckets of data are classified behind the zoom levels.

In various embodiments, a user interface (UI) is provided for the user to physically actuate (e.g., click) elements on the UI. In some embodiments, a user can just pass in a configuration for building the map.

The styling of the mapping in various embodiments is driven by the user, e.g., human driven, where the user can set certain boundaries. In some embodiments, the styling can be driven at least in part by data values. For example, auto detection can be performed wherein the minimum and maximum of the data set and its mean and standard deviation can be determined; and better defined selections can be provided to the user based on that data set. For example, a selection can be provided to the user to select a particular color for any data within the first three standard deviations.

In some embodiments, machine learning may be used to bucket the data and for clustering like and unlike data, for example, based on weights applied to historical and/or current data as a function of training and learning of a machine learning model.

Figure 13:
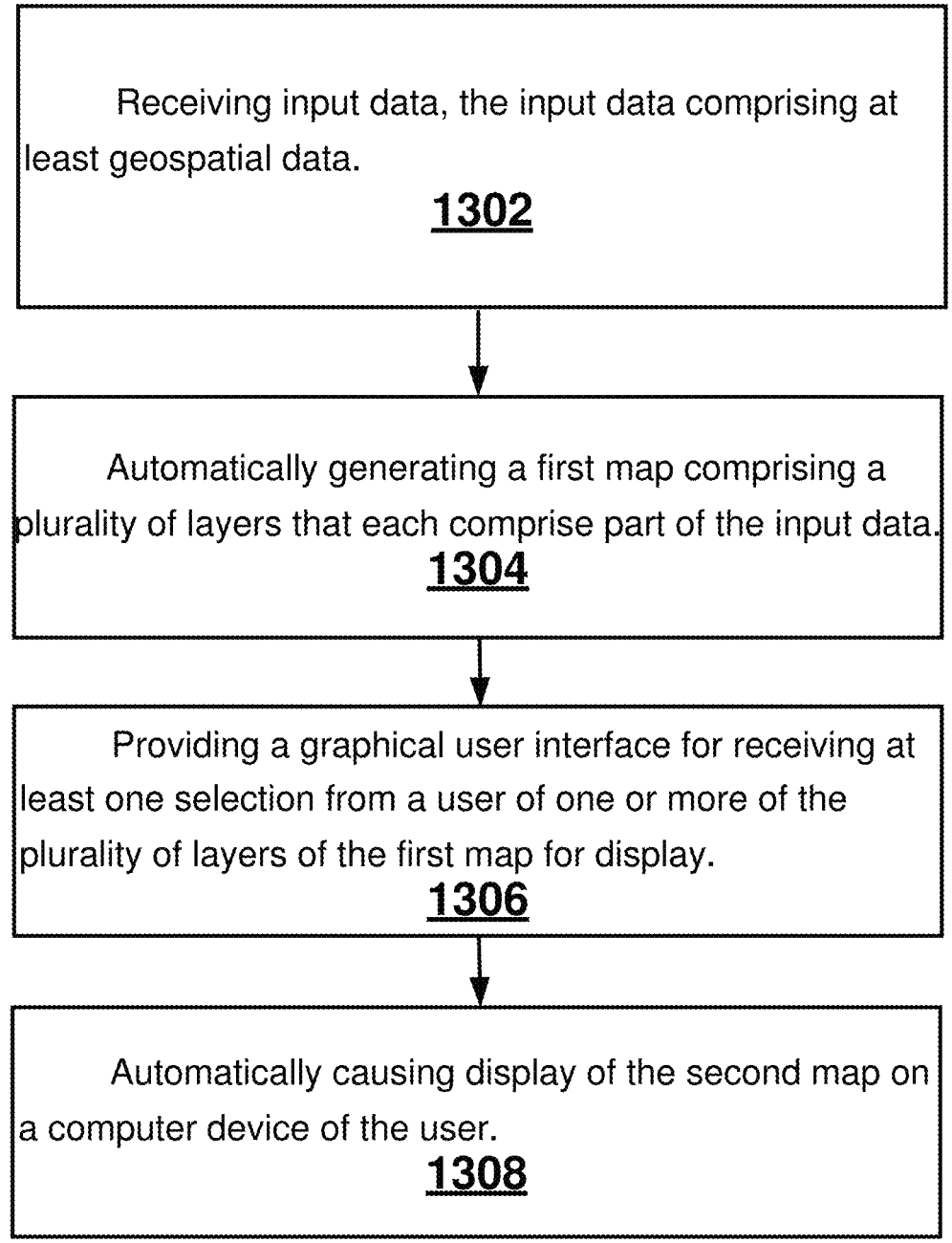
FIG. 13 is a flow diagram of a method, according to an example embodiment.

FIG. 13 is a simplified flow diagram of a method 1300, according to an example embodiment. Operation 1302 includes receiving input data, the input data comprising at least geospatial data, as described further herein. In operation 1304, the method further includes automatically generating a first map comprising a plurality of layers that each comprise part of the input data, as described further herein. In operation 1306, the method further includes providing a graphical user interface for receiving at least one selection from a user of one or more of the plurality of layers of the first map for display, as described further herein. In operation 1308, the method further includes automatically causing display of the second map on a computer device of the user, as described further herein.

Figure 14:
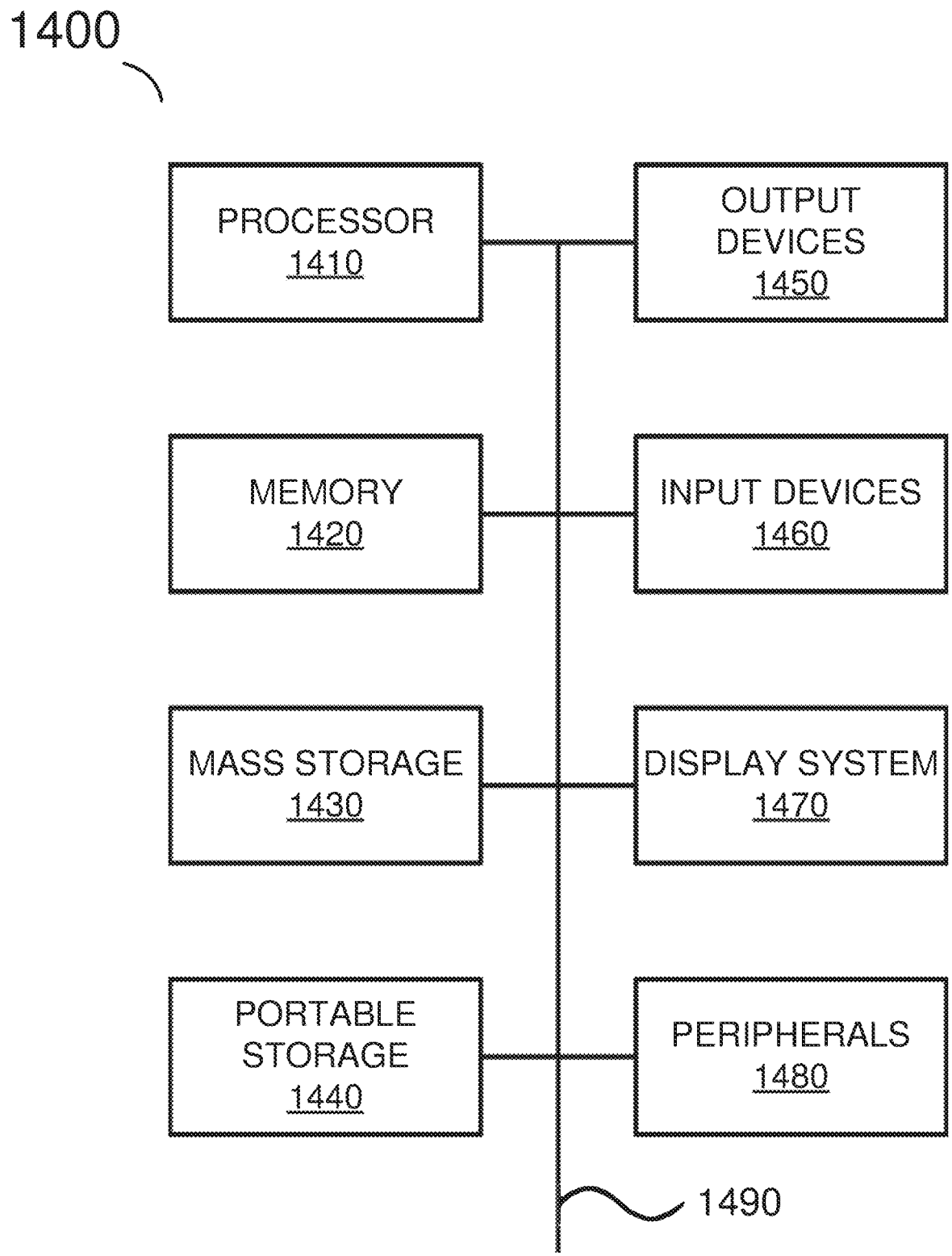
FIG. 14 is a simplified block diagram of a computing system, according to some embodiments.

FIG. 14 illustrates an exemplary computer system 1400 that may be used to implement some embodiments of the present invention. The computer system 1400 in FIG. 14 may be implemented in the contexts of the likes of computing systems, networks, servers, or combinations thereof. The computer system 1400 in FIG. 14 includes one or more processor unit(s) 1410 and main memory 1420. Main memory 1420 stores, in part, instructions and data for execution by processor unit(s) 1410. Main memory 1420 stores the executable code when in operation, in this example. The computer system 1400 in FIG. 14 further includes a mass data storage 1430, portable storage device 1440, output devices 1450, user input devices 1460, a graphics display system 1470, and peripheral device(s) 1480.

The components shown in FIG. 14 are depicted as being connected via a single bus 1490. The components may be connected through one or more data transport means. Processor unit(s) 1410 and main memory 1420 are connected via a local microprocessor bus, and the mass data storage 1430, peripheral device(s) 1480, portable storage device 1440, and graphics display system 1470 are connected via one or more input/output (I/O) buses.

Mass data storage 1430, which can be implemented with a magnetic disk drive, solid state drive, or an optical disk drive, is a non-volatile storage device for storing data and instructions for use by processor unit(s) 1410. Mass data storage 1430 stores the system software for implementing embodiments of the present disclosure for purposes of loading that software into main memory 1420.

Portable storage device 1440 operates in conjunction with a portable non-volatile storage medium, such as a flash drive, floppy disk, compact disk, digital video disc, or Universal Serial Bus (USB) storage device, to input and output data and code to and from the computer system 1400 in FIG. 14. The system software for implementing embodiments of the present disclosure is stored on such a portable medium and input to the computer system 1400 via the portable storage device 1440.

User input devices 1460 can provide a portion of a user interface. User input devices 1460 may include one or more microphones, an alphanumeric keypad, such as a keyboard, for inputting alphanumeric and other information, or a pointing device, such as a mouse, a trackball, stylus, or cursor direction keys. User input devices 1460 can also include a touchscreen. Additionally, the computer system 1400 as shown in FIG. 14 includes output devices 1450. Suitable output devices 1450 include speakers, printers, network interfaces, and monitors.

Graphics display system 1470 include a liquid crystal display (LCD) or other suitable display device. Graphics display system 1470 is configurable to receive textual and graphical information and processes the information for output to the display device. Peripheral device(s) 1480 may include any type of computer support device to add additional functionality to the computer system.

Some of the components provided in the computer system 1400 in FIG. 14 can be those typically found in computer systems that may be suitable for use with embodiments of the present disclosure and are intended to represent a broad category of such computer components. Thus, the computer system 1400 in FIG. 14 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including MAC OS, UNIX, LINUX, WINDOWS, PALM OS, QNX, ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1400 may be implemented as a cloud-based computing environment, such as a virtual machine operating within a computing cloud. In other embodiments, the computing system 1400 may itself include a cloud-based computing environment, where the functionalities of the computing system 1400 are executed in a distributed fashion. Thus, the computing system 1400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1400, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as PYTHON, JAVASCRIPT, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method, comprising:
   receiving the input data from one or more data sources, wherein the one or more data sources comprises at least documents from a distributed, multitenant-capable full-text analytics and search engine environment;
   automatically generating a first map comprising a plurality of layers that each comprise part of the input data, the plurality of layers configured for customization by a user, and visibility of each of the plurality of layers of the first map is fully controlled by the user using scale regions to reduce visual clutter;
   providing a graphical user interface for receiving at least one selection from the user of one or more of the plurality of layers of the first map for display and an indication that the user has zoomed in on the first map to a first area featuring a symbol corresponding to an item of interest;
   automatically generating, based on bounds of the dataset, a second map showing a second area of a bounding shape selected to fit the data related to the item of interest; and
   automatically causing display of the second map and the bounds of the dataset on a computer device of the user.

2. The method of claim 1, further comprising providing a combination of server-side clustering and client-side symbolization, such that the first map and the second map are seamlessly created.

3. The method of claim 1, further comprising aggregating at least a portion of the input data into buckets or groups on a server side device.

4. The method of claim 1, further comprising:
   binning the buckets or groups into grids; and
   calculating metrics for one or more of the grids,
   wherein the input data for one of the plurality of layers comprises aggregated metrics such that an amount of data needed for transmission from a server side device to the computer device is reduced.

5. The method of claim 1, further comprising:
   generating at least a first layer and a second layer; and
   overlaying the second layer being onto the first layer for display.

6. The method of claim 1, wherein at least one of the one or more data sources includes data in accordance with a Web Map Service (WMS) or a Tile Map Service (TMS).

7. The method of claim 1, further comprising configuring visual properties of at least one of the plurality of layers based on input from the user.

8. The method of claim 1, further comprising configuring visual properties of at least one of the plurality of layers based on values of the part of the corresponding input data for the at least one of the plurality of layers.

9. The method of claim 1, further comprising embedding the second map into one or more dashboards and caused to function as a visualization on the one or more dashboards.

10. The method of claim 1, further comprising receiving a selection through the graphical user interface of a zoom level for the map, and in response to the selection, scaling the second map in accordance with the zoom level.

11. The method of claim 10, further comprising configuring the second map to show individual documents selectively or automatically, in response to the selection of the zoom level.

12. The method of claim 1, further comprising providing a search field on the graphical user interface for receiving input from the user to search across one or more indices corresponding to the input data.

13. The method of claim 1, further comprising providing icons on the second map, a style of the icons being indicative of a particular characteristic of a part of the input data, wherein the style comprises size or color.

14. The method of claim 1, further comprising configuring a style of the second map such at least two levels of density of data on the map are configured for display in corresponding different colors or sizes.

15. The method of claim 1, wherein the geospatial data comprises at least Global Positioning System (GPS) data.

16. A system, comprising:

a processor; and a memory, the processor executing instructions stored in the memory to:

receive the input data from one or more data sources, wherein the one or more data sources comprises at least documents from a distributed, multitenant-capable full-text analytics and search engine environment;

automatically generate a first map comprising a plurality of layers that each comprise part of the input data, the plurality of layers configured for customization by a user, and visibility of each of the plurality of layers of the first map is fully controlled by the user using scale regions to reduce visual clutter;

provide a graphical user interface for receiving at least one selection from the user of one or more of the plurality of layers of the first map for display and an indication that the user has zoomed in on the first map to a first area featuring a symbol corresponding to an item of interest;

automatically generate, based on bounds of the dataset, a second map showing a second area of a bounding shape selected to fit the data related to the item of interest; and automatically cause display of the second map and the bounds of the dataset on a computer device of the user.

17. The system of claim 16, wherein the processor is configured to:

receive a selection through the graphical user interface of a zoom level for the map, and in response to the selection, scaling the second map in accordance with the zoom level; and configure the second map to show individual documents selectively or automatically, in response to the selection of the zoom level.

* * * * *